United States Patent [19]

Morrison et al.

[11] Patent Number: 5,938,505
[45] Date of Patent: Aug. 17, 1999

[54] HIGH SELECTIVITY OXIDE TO NITRIDE SLURRY

[75] Inventors: William R. Morrison; Kyle P. Hunt, both of Dallas, Tex.

[73] Assignee: Texas Instruments Incorporated, Dallas, Tex.

[21] Appl. No.: 09/034,514

[22] Filed: Mar. 4, 1998

Related U.S. Application Data

[63] Continuation-in-part of application No. 09/002,657, Jan. 5, 1998.

[51] Int. Cl.$^6$ ........................................................ B24B 1/04
[52] U.S. Cl. .................................. 451/36; 451/41; 451/63
[58] Field of Search .................................. 451/36, 41, 63, 451/285–289

[56] References Cited

U.S. PATENT DOCUMENTS 5,728,308  3/1998  Muroyama .................................. 216/88
5,860,848  1/1999  Loncki et al. .............................. 451/36

*Primary Examiner*—M. Rachuba
*Attorney, Agent, or Firm*—Jacqueline J. Garner; Wade James Brady; Richard L. Donaldson

[57] ABSTRACT

An improved slurry for polish removal. One application of this slurry is for shallow trench isolation processing in semiconductor manufacturing. The improved slurry has an enhanced oxide to nitride polish removal selectivity. A modified slurry is formed by mixing a polishing slurry with tetramethyl ammonium hydroxide and hydrogen peroxide. In an alternative embodiment, the modified slurry is formed by mixing a salt of tetramethyl ammonium with a base and with hydrogen peroxide to form the modified slurry. The improved slurry when used during the chemical mechanical polishing (CMP) step of an integrated shallow trench isolation manufacturing process allows the reverse pattern, etch and clean steps to be eliminated prior to CMP.

5 Claims, No Drawings

HIGH SELECTIVITY OXIDE TO NITRIDE SLURRY

This is a Continuation-In-Part Application of Ser. No. 09/002,657 filed Jan. 5, 1998 pending.

TECHNICAL FIELD OF THE INVENTION

The present invention relates to an improved slurry for semiconductor device manufacturing, one application of this slurry is in the formation of shallow trench isolation during semiconductor manufacturing. The slurry is used during the chemical mechanical polishing (CMP) step of an integrated STI process. Specifically, the invention relates to a modified slurry formed by mixing an existing polishing slurry with a solution of methyl salts that are pH adjusted with a base or an acid and a peroxide. This slurry solution mixture increases the oxide to nitride polish removal selectivity to allow the CMP process at STI to be performed without extra processing steps i.e. reverse patterned etch back.

BACKGROUND OF THE INVENTION

Various isolation structures are presently used for fabricating semiconductor devices. These isolation structures are used in order to isolate adjacent electronic devices (such as transistors) which are formed in fabricating certain semiconductor circuits.

Typically, isolation structures are created using the well-known local Oxidation of Silicon (LOCOS) isolation technique. The disadvantage to this process is that the silicon dioxide (isolator) is grown in an isotropic manner which consumes surface area on the semiconductor circuit and causes the adjacent electronic devices that are being isolated to be a fixed minimum distance apart. This limits the density of the electronic devices on each microchip.

Another technique used to create isolation structures is by using a trench. This method is known as Shallow Trench Isolation (STI). In the STI process, a pad-oxide ($SiO_2$) layer is grown on the semiconductor substrate after which a silicon nitride ($Si_3N_4$) layer is then deposited on the pad-oxide layer. Using well known methods the pad oxide/silicon nitride is patterned and etched to the determined widths of the isolation structures. Next, the semiconductor substrate is etched to form trenches and the surface is deposited with silicon dioxide to fill the trenches above the top of the silicon nitride surface.

Again using well known methods, the semiconductor device is reverse patterned and etched before the surface is planarized using CMP to remove the silicon dioxide from covering the nitride. Reverse patterned meaning the inverse of the trench pattern is used to etch the silicon oxide over the silicon nitride. Finally, the nitride is removed from the surface and the electronic devices may be built on the semiconductor substrate surface.

Three distinct disadvantages exist using this well known method. The most dominant disadvantage is cost. The extra mask adds a resist coat, mask expose and resist develop steps. Also added are an extra etch step and post photo clean step.

Another disadvantage to this method is that the slurry used to polish at CMP has a selectivity of <5:1, silicon dioxide polish rate to silicon nitride polish rate. The reverse etch process is required to eliminate substrate damage. Damage occurs in the isolated regions because the oxide in an area with a large percentage of trenches polishes at a much higher rate than the oxide over the nitride in a dense area of moats. Therefore, reverse etch is used to evenly distribute the density of the amount of oxide to be polished. The reverse etch processes require a pattern and an etch, thereby increasing the expense of wafer fabrication. Current CMP processes in STI applications without patterned etch back using conventional slurries would cause damage to the substrate in isolated regions while possibly not removing the silicon dioxide from the large or dense regions of nitride, making it unsuitable for production use.

The third known disadvantage is that the silicon dioxide formed after the reverse pattern and etch is able to break off and causes scratching during the CMP process.

Machines for fabricating semiconductor circuits are known in the art. CMP polishing of the wafers is used to form a planar surface at different levels of fabrication or to polish back to a surface after filling trenches or interconnects. In general, the polishing process is accomplished by bringing a wafer mounted on a rotating carrier into contact with a rotating polishing pad upon which is sprayed a slurry of insoluble abrasive particles suspended in an acidic or basic solution. CMP is the combination of mechanical and chemical abrasion; material is removed from the wafer due to both the mechanical buffing and the action of the acid or base.

The CMP process is known to provide excellent local planarity. Planarity is affected by feature height, size, layout, and density of the semiconductor device as well as by the polishing conditions such as mechanical polishing parameters, pad, and slurry.

Various methods have been attempted to remove the non-value added reverse etch process. Boyd and Ellul (J. M. Boyd, et al., Electochem. Soc. Proc., Vol. 95-5, 1996, p. 290) reported the use of a thin nitride overcoat deposited on top of the gap filled oxide to reduce dishing. The nitride overcoat provides protection to the underlying oxide in low lying regions while the high level oxide is being polished at a much faster rate due to the oxide:nitride selectivity of 4:1.

SUMMARY OF THE INVENTION

The present invention provides a method of enhancing the polish removal selectivity of a CMP polishing slurry. One such application of this slurry is used in a STI CMP process so that the reverse moat pattern and etch may be eliminated. It is comprised of polishing a semiconductor device with a modified slurry, said modified slurry formed by the process of combining a basic slurry with a salt of tetramethyl ammonium, a base, and hydrogen peroxide to form a modified slurry having enhanced polish removal selectivity. Preferably, the salt of tetramethyl ammonium is tetramethyl ammonium fluoride, the base is preferably potassium hydroxide, and the modified slurry preferably has a pH of between 11 and 13.

The present invention also provides a slurry having enhanced polish removal selectivity produced by the process of combining a basic slurry with tetramethyl ammonium hydroxide and with hydrogen peroxide to form a modified slurry having enhanced polish removal selectivity. This modified slurry preferably has a pH of 11 to 13.

The present invention is also not limited to STI type of polish applications but could be used in any application requiring a high oxide polish rate and a low nitride polish rate. Also this invention is not limited to only silicon chip manufacturing but could be used where these types of films are employed to manufacture a component.

Other embodiments and advantages of the invention are set forth, in part, in the description which follows and, in part, will be obvious from this description and may be learned from practice of the invention.

DETAILED DESCRIPTION OF THE INVENTION

STI CMP processing without the reverse pattern and etch processes requires a high polish removal selectivity for optimal STI structures to be fabricated on the semiconductor surface. As used herein, the phrase "polish removal selectivity" refers to the ratio of removal of silicon dioxide ($SiO_2$) to silicon nitride ($Si_3N_4$) as measured on sheet film wafers. In prior art techniques, the polish removal selectivity is most commonly 4:1. By using the techniques described herein, enhanced polish removal selectivity ratios of greater than 10:1 are achieved. As used herein, the phrase "enhanced polish removal selectivity" refers to a polish selectivity of 10:1 or greater. The technique involves modification of basic slurry compositions to achieve the enhanced polish removal selectivity.

In a preferred embodiment of the present invention, tetramethyl ammonium hydroxide (TMAH) and hydrogen peroxide are added to a slurry to improve the polish removal selectivity. Namely a slurry with an enhanced polish removal selectivity of 30:1 has been achieved. In an alternative embodiment, different salts of tetramethyl ammonium (TMA) and a highly basic solution are added to the slurry to enhance polish removal selectivity. A slurry using this method has shown an enhanced polish removal selectivity of greater than 10:1.

A suitable slurry is a colloidal silica formulation having an initial pH of around 10.5. Suitable slurries include, but are not limited to, Cabot (El Dorado Hills, Calif., USA) SC112 or Rodel (Newark, Del.) ILD1300. These slurries represent the mainstream slurries used in oxide polish operations by most major US semiconductor manufacturers. In the preferred embodiment of the present invention, the slurry is SC112 from Cabot.

When the correct amount of tetramethyl ammonium hydroxide (TMAH) alone is used (without $H_2O_2$), the pH may become greater than 13, causing the silica or other suspended particles to become non-colloidal (charge loss) and to fall out of suspension. Thus, the colloidal nature of the slurry is lost and slurry performance is adversely affected. The hydrogen peroxide is introduced to lower the pH to less than 13, thereby preventing silica dilution from the slurry. It is preferrable that the final pH of the slurry (after addition of the TMAH and $H_2O_2$) be in the range of 11.0 to 13, and most preferably in the range of 11.5 to 12.0. It is also preferable that the slurry to TMAH ratio (volume:volume) is between 50:1 to 55:1, or between 50 and 55 parts slurry to 1 part TMAH. The ratio of slurry to $H_2O_2$ is preferably between 300:1 to 500:1 (volume:volume). For all mixtures described herein, the TMAH has a 25% concentration (2.7 moles/L) and the hydrogen peroxide used has a 30% concentration (9.8 moles/L). With this modified slurry formulation, an enhanced polish removal selectivity of greater than 15:1 oxide to nitride is achieved. In fact, enhanced polish removal selectivity ratios of 30:1 may be obtained.

TMAH is known to have stability problems because of its degradation into trimethyl amines. This breakdown causes the performance of the slurry to degrade over time. Hence, it is preferable that the modified slurry be used soon after it is prepared. The modified slurry should be used within two hours after preparation, as the polish removal selectivity of the modified slurry diminishes to below 5:1 after about 3 hours.

Useful salts of TMA include, but are not limited to chloride, bromide, iodide, sulfide, or fluoride salts. Most preferably, the TMA salt is tetramethylammonium fluoride added to increase the pH to 11 to 13, and most preferably to 11.6 to 11.9. The correct pH is maintained by a basic solution such as, but not limited to potassium hydroxide. This modified slurry provides a selectivity of 10:1 or greater.

Interestingly, salts of tetraethyl ammonium hydroxide and of tetrabutyl ammonium hydroxide are not effective in enhancing polish removal selectivity.

The following examples are offered to illustrate embodiments of the invention and should not be viewed as limiting the scope of the invention.

EXAMPLE 1

Use of TMAH and Hydrogen Peroxide

This example describes the polish removal selectivity of TMAH used in conjunction with hydrogen peroxide. Pilot wafers (non-patterned) were ran on both plasma enhanced tetra ethyl ortho silicate (PETEOS) and Low pressure, chemical vapor deposited silicon nitride (LPCVD nitride). The slurry was mixed using the above formulations and the wafers polished on a Westech 472 polishing machine. Each pilot wafer was polished for 2 minutes using a slurry flow of 150 milliliters per minute. Pre- and post- measurements of the wafer thicknesses were made using a calibrated Tencor FT750.

Two examples of the Westech tool parameters for the polish process are shown below:

| | | |
|---|---|---|
| Table Speed: | 60 RPM | 85 RPM |
| Carrier Speed: | 40 RPM | 40 RPM |
| Down Force: | 7 PSI | 7 PSI |
| Backpressure: | 1.5 PSI | 4.5 PSI |

The polish rates of the PETEOS and LPCVD nitride were measured. The following formula was used to calculate selectivity:

$$XX = \text{oxide polish rate/nitride polish rate.} \quad 1)$$

This is expressed as XX:1 oxide to nitride selectivity, where "XX" is calculated as above.

$$\text{Polish rate} = [\text{Post thickness ( )} - \text{Pre thickness ( )}]/\text{time (minutes)} \quad 2)$$

These terms can be found in other semiconductor literature and are common definitions in the semiconductor field.

Below is the data reflecting the various ratios of TMAH and $H_2O_2$ added to SC112 to achieve different desired selectivities. The numbers in the table are expressed as ratios of volume of 25% TMAH (2.7 moles/L) and 30% $H_2O_2$ (9.8 moles/L) added to 3000 ml of SC112 slurry.

TABLE 1

Oxide and Nitride Removal Rates (RR)
Ratios of TMAH and $H_2O_2$ are in volume:volume

| TMAH | $H_2O_2$ | Oxide(RR) | Nitride(RR) | Selectivity |
|---|---|---|---|---|
| 30:1 | 150:1 | 100 | 7.5 | 13:1 |
| 100:1 | 150:1 | 2500 | 700 | 4:1 |
| 52:1 | 300:1 | 530 | 17.6 | 30:1 |
| 125:1 | 300:1 | 2600 | 700 | 4:1 |

The ratio of slurry to TMAH (volume:volume) was varied from 30:1 up to 125:1. Hydrogen peroxide was used to adjust the pH to values of 11.3 and 12.3. At a ratio of 52:1 of slurry to TMAH, the etch selectivity was 30:1.

Table 2 shows that an optimal pH of about 11.7 is preferable.

TABLE 2

Oxide and Nitride Removal Rates (RR)

| TMAH | $H_2O_2$ | Oxide(RR) | Nitride(RR) | Selectivity | pH |
|---|---|---|---|---|---|
| 53:1 | 300:1 | 450 | 17.7 | 25.3:1 | 11.7 |
| 54.1 | 400:1 | 950 | 50 | 19:1 | 11.5 |
| 111:1 | 500:1 | 2400 | 600 | 4:1 | 11.1 |
| 69:1 | 500:1 | 2400 | 400 | 6:1 | 11.3 |
| 54:1 | 500:1 | 460 | 20 | 23:1 | 11.7 |

EXAMPLE 2

Use of a TMA Fluoride Salt

This investigation was conducted to explore the contribution of a salt of TMA to the slurry. The example was conducted as described above in example 1, except tetramethyl ammonium fluoride salt was added to the slurry at the ratios given.

The mixture included adding 40% TMA(F) $H_2O_2$ and 8 molar potassium hydroxide (KOH) to 2000 ml of SC112. The KOH and the H2O2 were used to maintain a basic pH in the range described herein.

TABLE 3

Selectivity with Fluoride Salt

| TMA(F) | $H_2O_2$ | KOH | Selectivity |
|---|---|---|---|
| 10:1 | 500:1 | 200:1 | 6:1 |
| 15:1 | 500:1 | 200:1 | 8:1 |

TABLE 3-continued

Selectivity with Fluoride Salt

| TMA(F) | $H_2O_2$ | KOH | Selectivity |
|---|---|---|---|
| 17.5:1 | 500:1 | 200:1 | 15:1 |
| 20:1 | 500:1 | 200:1 | 13:1 |

These data show that fluoride salts of tetramethyl ammonium can be used to decrease the nitride removal rate, therefore increasing the oxide to nitride selectivity.

Although the present invention has been described in detail, it should be understood that various changes, alterations and substitutions may be made to the teachings herein without departing from the spirit and scope of the present invention, which is defined solely by the appended claims.

What is claimed is:

1. A method of enhancing the polish removal selectivity in a semiconductor process, comprising polishing a semiconductor device with a modified slurry, said modified slurry formed by the process of combining a slurry with salt of tetramethyl ammonium, a base, and hydrogen peroxide to form a modified slurry having enhanced polish removal selectivity.

2. The method of claim 1, wherein said salt of tetramethyl ammonium is selected from the group consisting of chloride, bromide, iodide, sulfide and fluoride.

3. The method of claim 1 wherein said salt of tetramethyl ammonium is tetramethyl ammonium fluoride.

4. The method of claim 1 wherein said modified slurry has a pH of 11.0 to 13.

5. The method of claim 1 wherein said modified slurry has a pH of 11.6 to 11.9.

* * * * *

UNITED STATES PATENT AND TRADEMARK OFFICE
CERTIFICATE OF CORRECTION

PATENT NO.   : 5,938,505
DATED        : August 17, 1999
INVENTOR(S)  : William R. Morrison and Kyle P. Hunt It is certified that error appears in the above-identified patent and that said Letters Patent is hereby corrected as shown below:

<u>Title page,</u>
Add Item [60] Related U.S. Application Data
-- [60] Provisional Application No. 60/035,020, Jan. 10, 1997. --

<u>Column 1,</u>
Lines 4 and 5, change: "This is a Continuation-In-Part Application of Ser. No. 09/002,657 filed Jan. 5, 1998 pending." to:

-- This is a Continuation-In-Part Application of Ser. No. 09/002,657 filed Jan. 5, 1998, pending, which claims priority under 35 USC § 119(e)(1) from provisional application number 60/035,020 filed 1/10/97. --

Signed and Sealed this

Third Day of September, 2002

*Attest:*

JAMES E. ROGAN
*Attesting Officer*   *Director of the United States Patent and Trademark Office*